United States Patent [19]

Piepho

[11] Patent Number: 5,143,602

[45] Date of Patent: Sep. 1, 1992

[54] APPARATUS FOR THE SEPARATION OF SOLIDS FROM FLUIDS OR SEDIMENTS FROM EMULSIONS

[75] Inventor: Ralf F. Piepho, Wennigsen, Fed. Rep. of Germany

[73] Assignee: Ralf F. Piepho Abwassertechnick GmbH, Fed. Rep. of Germany

[21] Appl. No.: 618,165

[22] Filed: Nov. 26, 1990

[30] Foreign Application Priority Data

Nov. 29, 1989 [DE] Fed. Rep. of Germany ....... 3939426

[51] Int. Cl.$^5$ ............................................ B01D 33/048
[52] U.S. Cl. ..................... 210/97; 210/208; 210/210; 210/387; 210/403
[58] Field of Search ............ 210/86, 97, 104, 205, 210/208, 256, 387, 400–404, 210

[56] References Cited

U.S. PATENT DOCUMENTS

| | | | |
|---|---|---|---|
| 3,273,494 | 9/1966 | Cocchiarella | 210/403 |
| 3,375,932 | 4/1968 | Ishigaki | 210/401 |
| 3,780,863 | 12/1973 | Light | 210/387 |
| 4,088,581 | 5/1978 | Carle | 210/401 |
| 4,826,596 | 5/1989 | Hirs | 210/387 |

*Primary Examiner*—Ivars Cintins
*Attorney, Agent, or Firm*—Lockwood, Alex, FitzGibbon & Cummings

[57] ABSTRACT

There is described devices and a process for the separation of solids from a fluid. The devices contain a cylinder drum, the casing of which has at least one, and preferably two openings which are positioned diametrically opposite to one another. The cylinder drum is positioned with its circumference within the curve of a power driven jointed belt conveyor and a filter belt rotates between the jointed belt conveyor and the surface of the cylinder drum casing. The internal space of the cylinder drum accommodates the fluid which is to be processed and serves as the reaction and settling container. The cylinder drum is rotated either in stages or continuously during the process.

31 Claims, 6 Drawing Sheets

APPARATUS FOR THE SEPARATION OF SOLIDS FROM FLUIDS OR SEDIMENTS FROM EMULSIONS

BACKGROUND AND DESCRIPTION OF THE INVENTION

The invention relates to a device and a process for the separation of solids from a fluid or for the separation of sediments which have precipitated out of emulsions by means of a band filter, a mixing device, and equipment for the metered addition of mixtures of chemicals.

Such a device, which may also be transportable, and which is used for processing used emulsions or industrial wastes, if these emulsions have been separated with suitable chemicals and the sediment has been separated from the fluid which is usually water, is described in European Patent No. 0 067 959. That device comprises a reaction container in which the wastes to be processed are held, and in which mixing devices or stirring mechanisms are located in order to thoroughly mix the mixture of chemicals with the wastes, an adjoining flocculation container in which the wastes which have been mixed with the mixture of chemicals are held while the separating reactions proceed and in which the flocculation which is forming can be precipitated, and a filter belt through which the waste liquids which have remained with the sediment flow into a filtrate collection tank with the sediment remaining behind on the filter belt.

This device is useful and valuable for purifying wastes. However, it has the disadvantage due to the various containers which are needed, that it requires a relatively large surface area, and it is not very practical for smaller operations or for limited spaces which have an output which remains constant.

In the older but later published German Patent Application No. P 38 42 557, an analogous process for the processing of industrial wastes and emulsions is described in which a more compact manner of construction is attained by encompassing a cylinder drum with a filter device. The drum is positioned in a supported manner in a curve of a continuous conveyor belt comprising individual elements connected in an articulated manner which are set into rotation. A filter belt of non-woven fabric is moved forward between the cylinder drum casing and the conveyor belt, and the cylinder drum has openings. The sediment forming in the cylinder drum is removed from the cylinder drum and transferred onto the conveyor belt to be discharged from the device along with the used filter belt.

In this device a more compact construction is achieved because only the reaction container is still positioned separately and next to the filter device. The residence time is spent in a flocculation container which also contains the cylinder drum with the filter belt. Therefore, an additional container in which the fluid must reside for a specific time can be eliminated.

It is thus the task of the present invention to achieve a further compaction of such a device as has already been described, by dispensing with a separate mixing container and reaction container, whereby the device essentially contains only one container to perform both functions. Accordingly, the device becomes highly adaptable and can be accommodated within the smallest spaces, and it has a relatively high throughput capacity so that additional industrial operations are afforded the possibility for regular and timely waste purification.

In accordance with the invention the mixing container in which the wastes to be purified or processed are mixed with the chemical mixture and the container for accommodating the residence time for chemical reaction between the chemical mixture and the wastes are combined and located within a rotating cylinder drum. The drum has a casing surface which has at least one, and preferably two openings positioned diametrically opposed to one another. The drum is set into rotary motion by a motor driven continuous jointed belt conveyor, the cylinder drum being positioned within a curve of the belt conveyor. A filter belt, preferably one of a non-woven fabric, has a width which corresponds to the width of the cylinder drum casing and the jointed belt conveyor. At the discharge end where the jointed belt conveyor separates from the casing surface of the cylinder drum, the filter belt is conducted under a pressing roller, and is finally discarded. The sediment located on the filter belt is thereby pressed and dewatered. The cylinder drum preferably only rotates in stages over short distances, but it can also rotate slowly and continuously. The rotation speed can be regulated and is determined by the type of filtration process or by the type of the wastes which are to be processed.

It will now be appreciated that the cylinder drum, which has a casing which is provided with openings on at least one point, forms either a reaction container or a container for the residing fluid. This fluid is mixed with the chemicals and the cylinder drum is filled to approximately one third of its diameter or more. Within the interior of the cylinder drum, a mixing turbine is attached on a projecting arm which projects through a lateral opening. This projecting arm also serves as a feed for the mixture of the chemicals which are provided for the separation of the emulsions. A device for monitoring the level of the fluid is also located within the interior of the cylinder drum and attached to the projecting arm. The cylinder drum preferably has two openings positioned opposite one another in the casing. The size of these openings is dependent on the volume of the cylinder drum.

Corrugations proceeding in the direction of the diameter and in the form of low metal sheets the free upper edges of which proceed in a manner following the direction of rotation, can be attached to the internal side and non-perforated portion of the cylinder drum casing.

The pressing roller is supported by means of swivelling arms, the centers of gravity of which are located on the external housing of the device. It presses the sediment located on the filter belt, and the filter belt is conveyed along between the jointed belt conveyor and cylinder drum. The supply roller for the filter belt is supported within a roller body and, upon reaching a specific minimal diameter, activates a switching device which indicates that the roller should be changed or switches the machine off.

Because the device of the present invention has been greatly simplified and is easy both to monitor and to maintain, the actual housing of the device comprises only sidewalls which are held in their positions relative to one another by means of the various support axes for the continuous jointed belt conveyor and for the supply roller of the filter belt.

The lower portion of the housing defined by the two sidewalls is formed into a trough into which the purified wastes then flow as soon as the edge of a cylinder drum casing part bounding one opening of the cylinder drum appears below the fluid level set in the cylinder drum. The fluid then flows against the direction of rotation of the cylinder drum, over the dam-like end of the cylinder drum casing part, into the trough and, finally, into a depression which serves as a collecting container for the purified wastes, and from which it is pumped out.

Because the cylinder drum serves both as a reaction container as well as a sedimentation container, the precipitate can settle to the bottom on the uninterrupted portion of the cylinder drum casing. Also, because the cylinder drum rotates slowly, and preferably in stages in such a way that the cylinder drum stands still between every cycle, sediment can precipitate over a long period of time and deposit, and then be moved by the purified wastes flowing out onto the filter belt lying free in the open within the opening of the cylinder drum casing. The purified wastes flow through the filter belt where fine particles are filtered out, and reach the trough which is positioned underneath the cylinder drum and through which the lower section of the jointed belt conveyor is also conducted.

Drive motors are located next to and on one side of the device. The drive motors are for the continuous jointed belt conveyor, as well as for the dosing device by which the chemical mixture is moved into the interior of the cylinder drum for the processing of the wastes. The sidewalls of the cylinder drum have larger openings so that the installation of the mixing device and of the level switch is facilitated. The water to be purified is also conducted in a suitable manner through these openings and into the interior of the cylinder drum.

The device is constructed so that the weights on both sides of the device are equalized or approximately equalized. The weight of the two motors with the gearing approximately corresponds to the weight of the dosing device with the supply of chemical mixture for the processing of the fluid. Both motors are adjustable so that, as previously mentioned, the rotational speed can be varied, as can the quantity of the chemicals which are conveyed to the wastes to be purified.

The invention will now be described in greater detail by means of an example of an embodiment of execution, which is depicted in the attached drawings.

DESCRIPTION OF THE PREFERRED EMBODIMENTS

Figure 1:
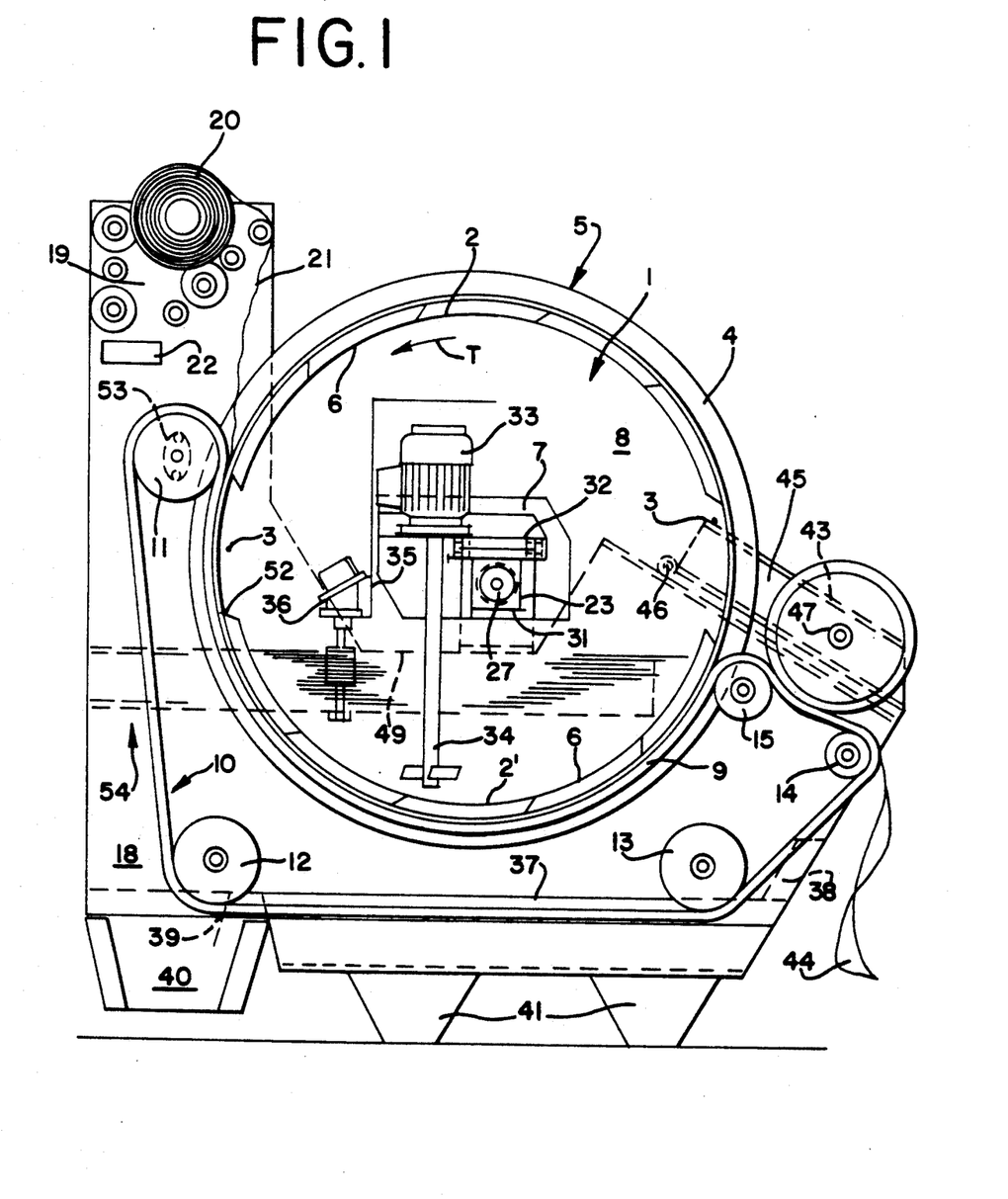
FIG. 1 is a side elevation schematic representation of a preferred embodiment of a device in accordance with the invention.

The device can be distinctly seen in its general schematic construction from FIG. 1 which depicts the essential parts in cross-section. The primary portion of the device is a cylinder drum 1 of a cylindrical shape with a casing 2 which, in the example of execution depicted, has openings 3 at two points which are positioned diametrically opposite to one another. The ends of the cylindrical cylinder drum are covered by circular metal sheets 4 the edges of which project out beyond the cylinder drum casing in a flange-like manner, as depicted at 5 in FIG. 2. Components 6, the purpose of which will be illustrated further to follow, are formed within the corners between the cylinder drum casing 2 and the flange-shaped edges 5 of the covers 4 of the cylinder drum which form a wall. The covers 4 of the drum 1 include larger recesses 7 through which access to the interior space 8 of the cylinder drum is possible from the sides.

The cylinder drum 1 has no axle support. It lies within the curve 9 of a continuous jointed belt conveyor 10 which proceeds around guide rollers 11, 12, 13, 14 and 15. The roller 11 is driven by means of a geared motor 16 and the drive is carried out in a manner which is either continuous and adjustable in its rotational speed, or discontinuous and in a step-like manner with an adjustable speed.

The rollers 12 to 15 are mounted on support axes which, at the same time, form spacing elements between lateral housing walls 17 and 18. The sidewalls on one side further support an arrangement of rollers 19 which extend between the sidewalls and a supply roller 20 for a filter belt 21. The roller arrangement 19 is constructed in a V-shaped or funnel-shaped manner, so that the supply roller 20 slips more and more in a downward direction into the funnel-shaped configuration of the roller arrangement as its diameter is reduced due to the consumption of the filter belt in order to finally trigger a signal or switch to switch off the machine shortly before the exhaustion of the filter belt supply. Corresponding activation devices 22, which may have several forms, are also shown.

Figure 2:
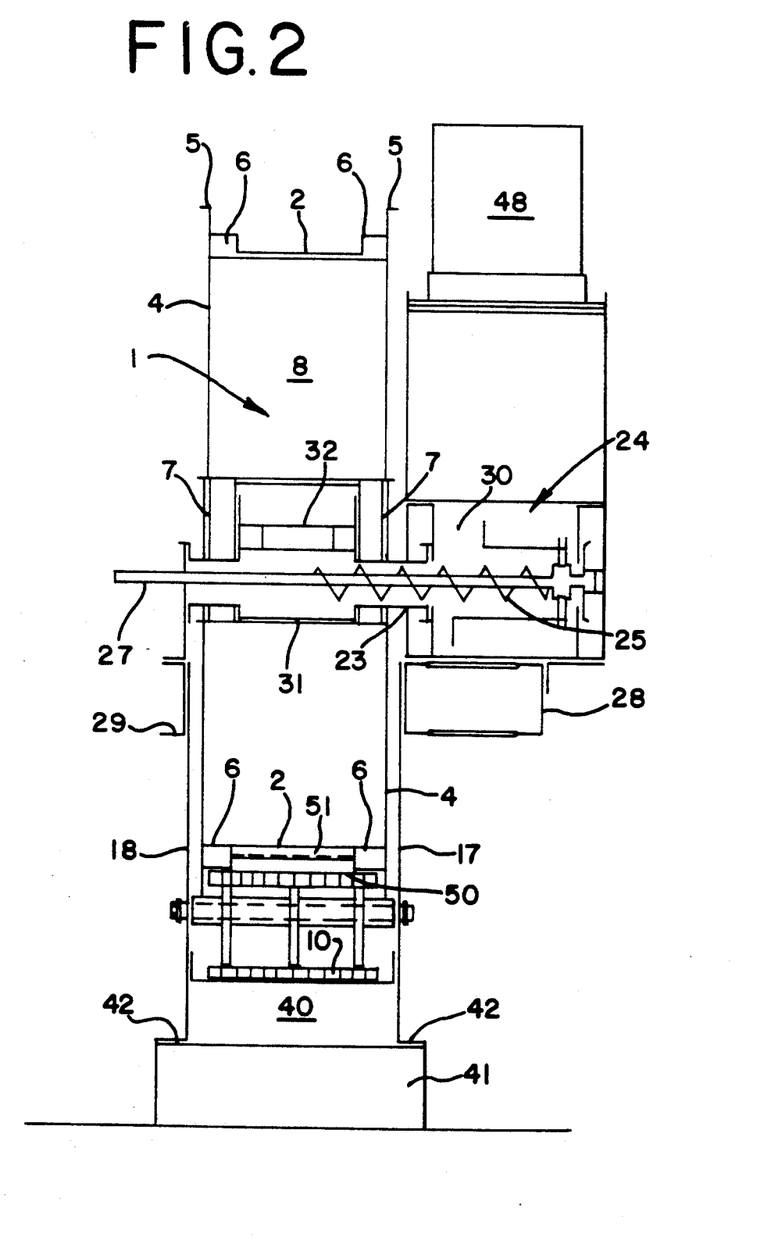
FIG. 2 is a schematic front end view of the device substantially as shown in FIG. 1.
Figure 3:
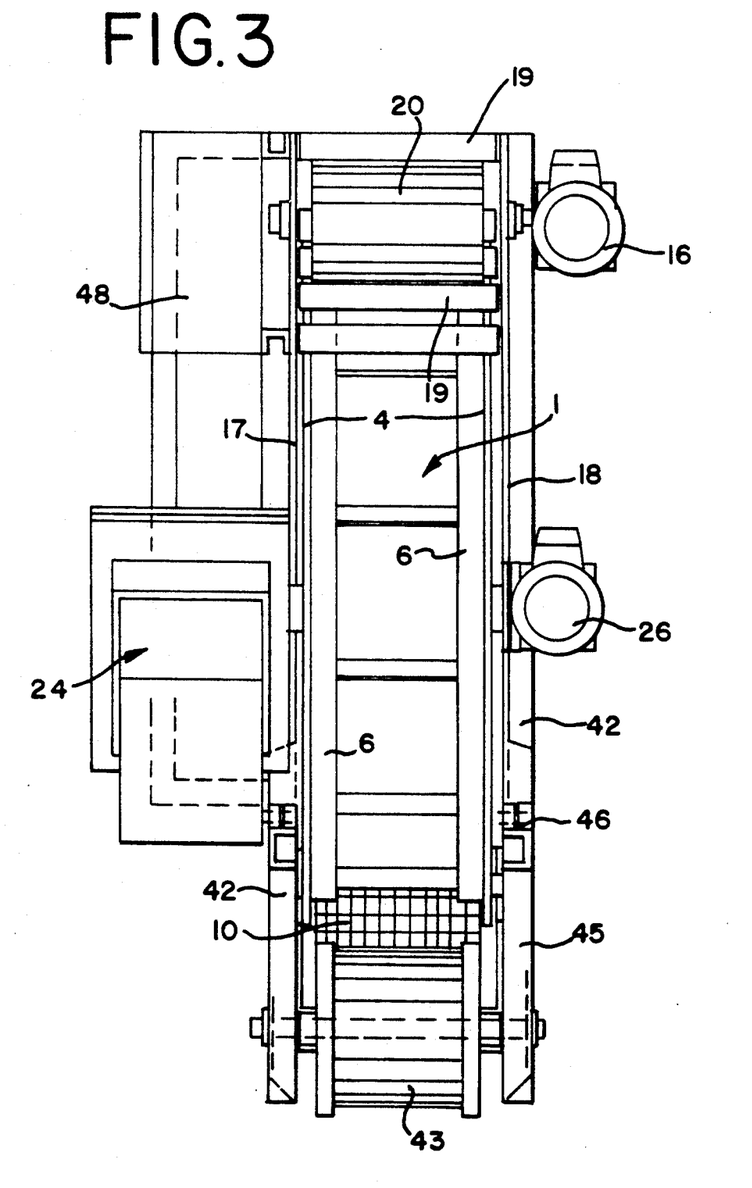
FIG. 3 is a schematic plan view of the device substantially as shown in FIG. 1.
Figure 4:
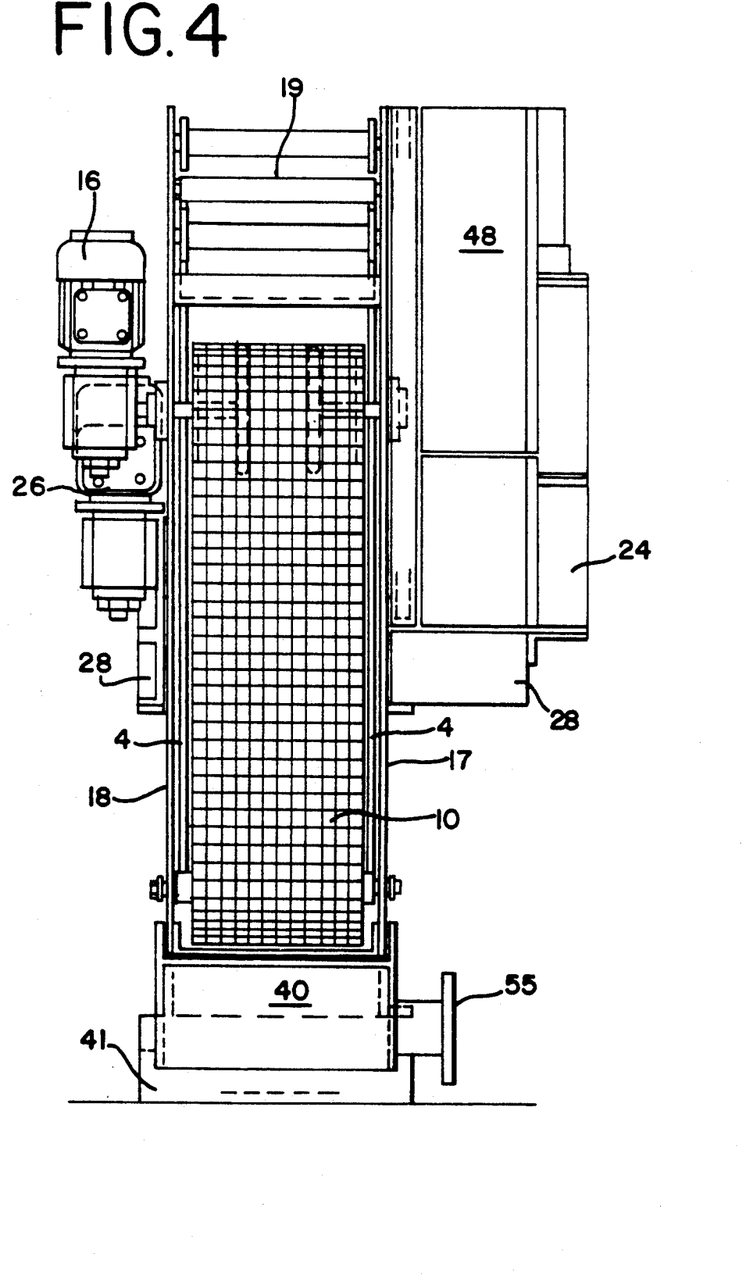
FIG. 4 is a schematic rear end view of the device substantially as shown in FIG. 1.

The housing 23 of a dosing device 24 rotatably supports a helical screw conveyor 25. The screw conveyor is driven by a geared motor 26, as seen in FIG. 3, but which has been omitted in FIG. 2. The screw conveyor projects from one side and into the interior of the cylinder drum 1. The geared motor can be attached by a plug connection and on a torque absorbing support onto the end 27 of the shaft of the helical screw conveyor 25.

The dosing device 24 is attached and held to the housing wall 17 by brackets 28 and 29. The dosing device contains a supply of a chemical mixture which drops into the housing of the helical screw conveyor through the opening 30. By the adjustment of the rotational speed of the helical screw conveyor 25, the chemical mixture can be added in a metered manner to the internal space of the cylinder drum 1, depending on the type of the fluid which is to be processed. The chemical mixture then drops through the opening 31 into the interior of the cylinder drum. The supply of the fluid or the wastes to be processed are carried out through the lateral openings 7 in the circular metal sheets 4 which form the sidewalls of the cylinder drum.

A motor 33 drives a mixing device 34 and is attached to a support 32 which is attached on a housing 23 of the helical screw conveyor 25 of the dosing device. The support 32 which supports the motor 23 likewise serves as a holder for an additional support or angled guide unit 35 to which a level switch 36 is connected.

The sidewalls 17 and 18 of the device are sealed off on their lower edges by means of a trough-shaped plate 37 which on one end has a part 38 projecting upwardly. On the other end it has an overflow unit 39 which discharges into a collecting channel 40 which collects the purified fluid and carries it from the device. The device as a whole is supported on runners 41 which are screwed to the lower angled ends 42 of the sidewalls 17 and 18.

As shown in FIG. 1, the filter belt 21 is conducted between the cylinder drum circumference and a part of the continuous jointed belt conveyor 10 for a distance until the jointed belt conveyor with the curve 9 loops around the cylinder drum. At the end of the loop where the jointed belt conveyor separates from the drum, the filter belt is likewise moved along with the conveyor from the cylinder drum by the guide roller 15 and conducted under a pressing roller 43. After passing the guide roller 14, the filter belt is separated from the jointed belt conveyor and is discarded as depicted at 44.

The pressing roller 43 is supported on arms 45 which are, in turn, swivelably supported at point 46 on the edge part of the housing walls 17 and 18. The pressing roller 43 presses the filter belt 21 which is carried along on the jointed belt conveyor 10 between the guide rollers 14 and 15 and, thereby, dewaters the precipitate. The pressing roller 43 is supported in a rotatable manner on a bar 47 which spaces and holds the arms 45.

As seen in FIG. 3, a switch box 48 is provided for the electrical switching and regulating devices, by which the motors of the device, as well as the other signal and monitoring devices, can be regulated and switched.

The manner of operation of the device will now be described to follow:

The fluid to be processed, which is in most cases either water or an aqueous emulsion, is conveyed through feed lines (not shown) to the internal space 8 of the cylinder drum 1 in the position depicted in FIG. 1, until it has reached the level or height in the cylinder drum which is indicated at 49. The cylinder drum has been rotated in advance by the jointed belt conveyor 10 so that the filter belt 21 surrounds or covers the portion of the cylinder drum surface around which the jointed belt conveyor is looped, passes under the pressing roller 43, and is conveyed over the guide roller 14 until it has reached the position which is depicted in FIG. 1. In this position the lead end of the filter belt projects above the guide roller 14. Both the openings 3 in the cylinder drum casing 2 then lie in a horizontal plane, so that the lower portion of the cylinder drum casing with the metal sheets 4 form a container for the fluid to be processed.

In this position the cylinder drum will also assume a position in which both openings 3 in the casing of the cylinder drum are positioned above the level of the fluid 49. The jointed belt conveyor 10 with the filter belt lying on it is thereby supported against the components 6 on the cylinder drum casing parts, so that a free space 51 remains between the actual cylinder drum casing 2 and the filter belt, which is depicted in FIG. 2 by means of the thick lines 50.

After the fluid has reached the level depicted in FIG. 1 and the cylinder drum is located in the position shown therein, the mixture of chemicals for the processing of the fluid is added in a metered manner by activation of the shaft of the helical screw conveyor 25, as shown in FIG. 2, so that the chemicals drop in through the opening 31 and into the fluid. The mixing device 34 is then set into motion by supplying energy to the motor 33 so that the mixture of chemicals is thoroughly mixed into and distributed in the fluid. The level switch 36 ensures that the fluid height or level can not be so high that the fluid overflows through the openings 3.

When the chemicals are uniformly distributed in the fluid, a physical-chemical reaction process takes place which leads to the pollutants contained in the fluid being flocculated and sedimented out. They therefore collect on the internally positioned surface of the cylinder drum casing 2. After a thorough mixing, the mixing device is switched off to provide a residence time during which these reaction processes and sedimentation can proceed.

Throughout the entire time of supplying the fluid, the dosing of the chemical mixture, the mixing of the two, the reaction processes and the sedimentation, the cylinder drum may rotate, either continuously or in stages, at a speed which is so adjusted that the fluid begins to flow directly over the edge 52 of the casing part 2 of the cylinder drum, provided the reaction process and the sedimentation have completely ended. Because the flocculents which form in the fluid sink to the bottom, the emptying of the cylinder drum can begin before these flocculents have reached the base of the cylinder drum. Particularly during a stage-like rotation of the cylinder drum, emptying is still possible even before the entire flocculated material has completely sedimented. Fine particulate flocculents which precipitate slowly and with difficulty are retained on the filter belt 21 which is positioned between the cylinder drum circumference and the jointed belt conveyor 10, in a length which corresponds to the curve of the jointed belt conveyor with the cylinder drum. Because new filter belt is always carried along between the jointed belt conveyor and the cylinder drum, it is ensured that the fluid collecting on the trough-shaped plate 37 is free from sediment.

As has already been stated above, the cylinder drum is set into rotation in the direction of the arrow T by the jointed belt conveyor 10 when the roller 11, which is also a guide roller, is set into motion. Because it is driven, this roller is also supported in a different manner than the remaining guide rollers, as is indicated by the coupling flange 53.

At the time that the casing part 2, which is depicted at the bottom in FIG. 1, is aligned vertically, at the latest the precipitate which has collected on the bottom is completely deposited on the filter belt and a complete emptying of the cylinder drum takes place. So that the sediment can settle in an orderly manner and so that the necessary space is present, a free space 51 is provided between the jointed belt conveyor and the cylinder drum casing 2.

The filter belt 21 now bearing the precipitate or the sediment moves with the jointed belt conveyor 10 further in the direction of movement of the jointed belt conveyor, which is indicated by the arrow 54. In this manner the precipitate or sediment proceeds under the pressing roller 43 where it is dewatered and is then, along with the filter belt, discarded.

Figure 5:
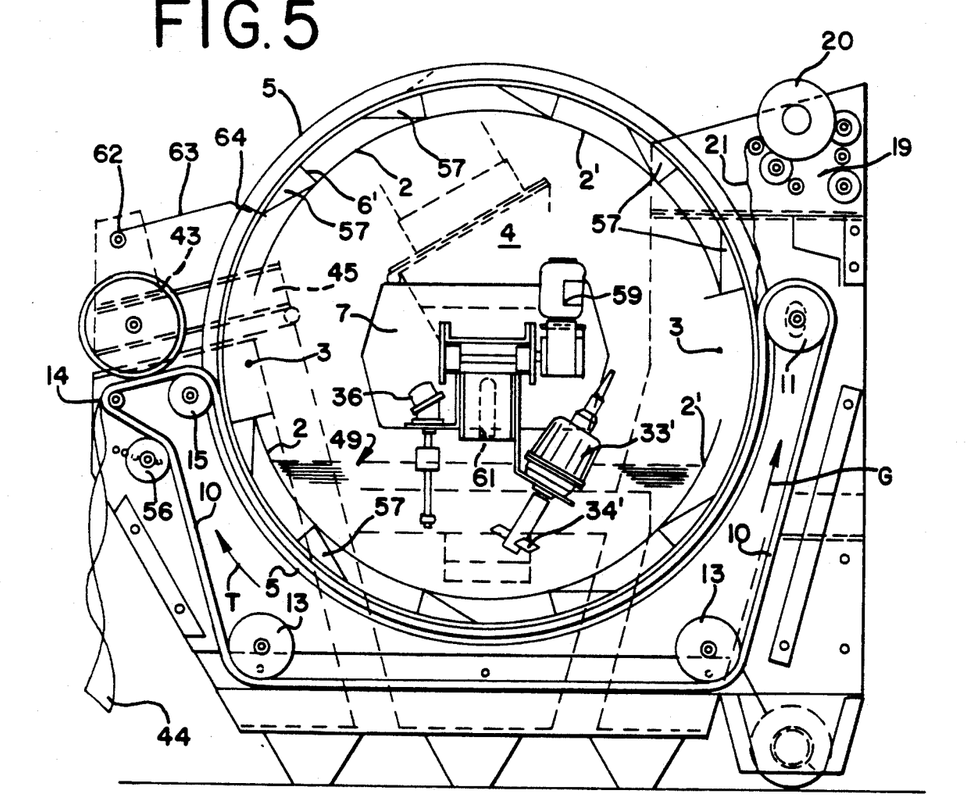
FIG. 5 is a schematic side view of a modified device in accordance with the invention.
Figure 6:
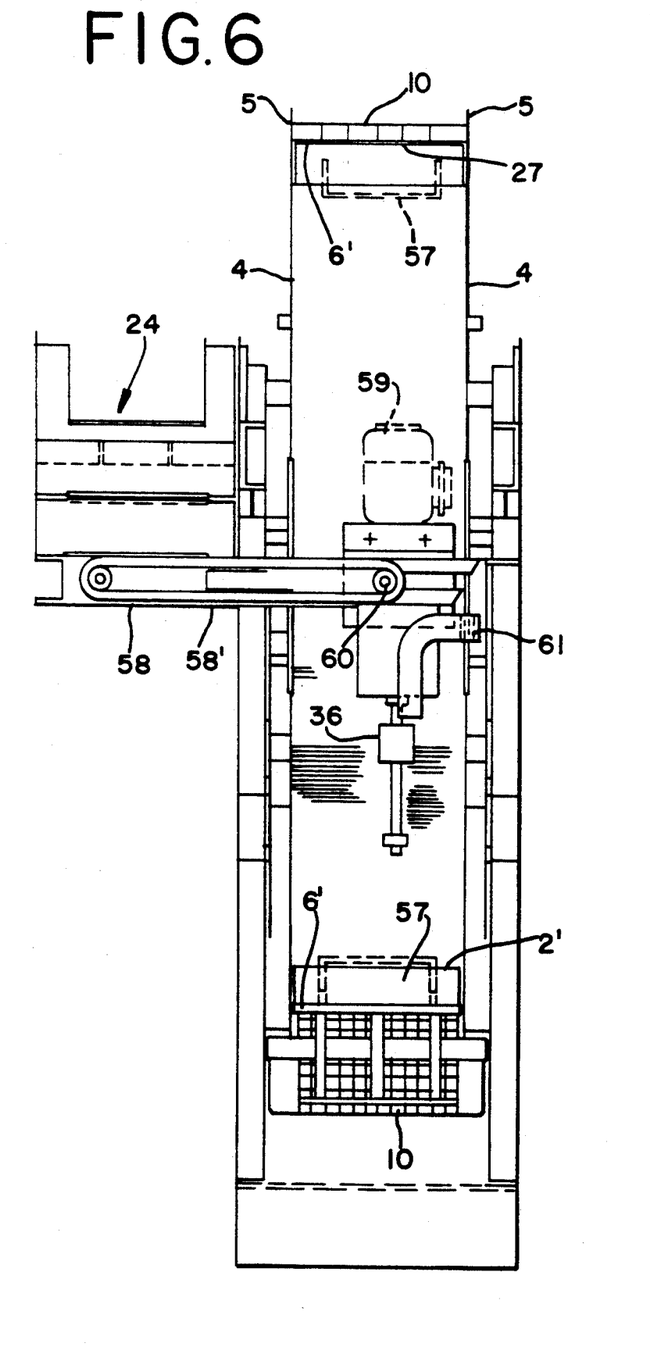
FIG. 6 is a schematic front end view of the modified device substantially as shown in FIG. 5.
Figure 7:
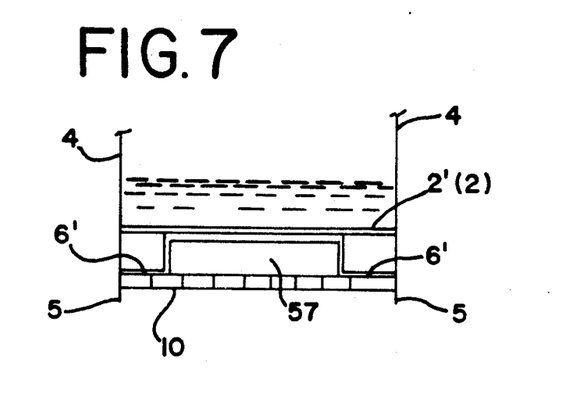
FIG. 7 is a sectional depiction through a detail in the cylinder drum casing of FIGS. 5 and 6.

A modified embodiment of the device of FIGS. 1 to 4 is depicted in FIGS. 5, 6 and 7. The device in FIGS. 5–7 corresponds substantially completely to that in FIGS. 1–4, however, the direction of movement of the cylinder drum 1 is in the opposite clockwise direction, whereas in the device of FIGS. 1–4, it rotates in a counterclockwise direction. This is also evident from the direction of the filter belt 21. As shown in FIG. 5, the cylinder drum rotates in the direction of the arrow T and the jointed belt conveyor moves in the direction of the arrow G.

The internal arrangement of the mixing turbine with the motor 33' and the mixing device 34', as well as the dosing device for the separating materials, is more compact, but corresponds in its effects to the first described embodiment. Instead of using a helical transport screw conveyor for dosing the separating agent, the embodiment shown in FIGS. 5 and 6 has a cellular band 58 which doses the finely particulate separating agent into the fluid. The cellular band 58 slides with its lower section into a plate 58', which makes a transition into a shaft on the edge of which the cells are released, so that the separating agent drops into the fluid.

One further modification in the embodiment shown in accordance with FIGS. 5-7 is the construction of the external surface of the circularly curving partial casings 2' of the cylinder drum casing 2. As is evident from FIGS. 5-6, wedge-shaped parts which are U-shaped in cross-section are attached to the external surface of the casing 2' which, along with the cellular band and the filter belt positioned thereon, form pockets 57, which are narrower than the cylinder drum is wide. The depth of the pockets thus formed decreases, bit by bit, in the direction of the cylinder drum casing, down to a value of zero.

Upon emptying the specific container formed by a casing part of the cylinder drum, sediment moved along with the fluid is collected and then transferred onto the filter belt 21. Thus, the sediment is concentrated on limited surfaces of the filter belt.

To ensure that the pockets empty completely and, before they are refilled, that they are free of sediments, a scraper which comprises an arm 63 which can be swivelled around a bar 62 is provided which on its end supports a blade 64 of rubber. The blade is oriented approximately radially to the midpoint of the cylinder drum. Because the cellular band with the non-woven fabric positioned thereon has already separated from the cylinder drum into the U-shaped structure below the stripper, the blade 64 can now enter into the cylinder drum casing and scrape out the remaining sediment. As soon as the highest point on the oblique surface has been reached, the blade drops back onto the external surface of the casing part so that upon a further rotation of the cylinder drum to again move upwardly on the next following inclined surface, the cycle is repeated to remove the sediment. A blocking stud (not shown) prevents the blade from dropping through an opening 3 in the cylinder drum casing into the interior of the cylinder drum to prevent damage upon rotation.

Components 6 with a flange-shaped form, as shown in FIG. 1, are also provided on the external side of the casing of the cylinder drum. These flange-shaped parts essentially form the lateral attachments of the wedge-shaped pockets.

All other functions with respect to movement, drive, filter belt supply, pressing roller, etc. in this embodiment correspond to those of FIGS. 1-4. Because of the use of a water tight drive motor 31, the embodiment in FIGS. 5-7 can be constructed in a manner which is even more compact than that in accordance with that shown in FIG. 1.

I claim:

1. An apparatus for the separation of solids from a fluid or sediments precipitated from emulsions, having mixing means; a reaction chamber with the mixing means therein; dosing means for metering a chemical mixture into the reaction chamber for mixing with the fluid in the chamber; a filter belt; a cylinder drum around which the filter belt rotates; and a continuous conveyor belt composed of individual links which rotates the cylinder drum which is supported in a suspended manner within a curve of the conveyor belt, whereby the filter belt is conveyed along between the conveyor belt and the casing of the cylinder drum, and wherein the improvement comprises:

the cylinder drum having a casing with at least one opening therein and sidewalls on the cylinder drum having at least one opening into which said dosing means extends;

said dosing means supporting said mixing means in said cylinder drum;

a level switch also supported on said dosing means in said cylinder drum; and a fluid inlet for introducing fluid which is to be processed into the interior of said cylinder drum, said fluid inlet extending through an opening in at least one of said sidewalls.

2. The apparatus of claim 1, wherein said casing of said cylinder drum has at least two openings therein positioned opposite one another; and the sidewalls of said cylinder drum have edges which extend beyond the circumference of the cylinder drum to form flanges which receive the continuous belt conveyor therebetween.

3. The apparatus of claim 2, including a housing having sidewalls; said continuous belt conveyor is jointed and drives the cylinder drum; guide rollers supported on bars in a rotatable manner, said guide rollers guiding said continuous joined belt conveyor and maintaining the distance between the sidewalls of said housing.

4. The apparatus of claim 2, including a pair of guide rollers positioned on opposite sides of said cylinder drum and substantially diametrically opposite each other, one of said guide rollers driving said continuous belt conveyor.

5. The apparatus of claim 4, including a trough for collecting filtrate from said cylinder drum and filter belt for discharging the filtrate the apparatus, said trough being attached between said housing sidewalls.

6. The apparatus of claim 2, wherein said filter belt is discharged from between said drum and said conveyor belt, a pair of spaced guide rollers adjacent the filter belt discharge and supporting said filter belt in an inclined plane, and a pressing roller positioned relative to said pair of spaced guide rollers to exert its weight on the portion of the filter belt which is positioned between the guide rollers.

7. The apparatus of claim 2, including wedge-shaped pockets positioned on the outer surface of at least a portion of said cylinder drum.

8. The apparatus of claim 2, wherein said reaction chamber is in said cylinder drum.

9. The apparatus of claim 1, including a housing having sidewalls; said continuous belt conveyor is jointed and drives the cylinder drum; guide rollers supported on bars in a rotatable manner, said guide rollers guiding said continuous jointed belt conveyor and maintaining the distance between the sidewalls of said housing.

10. The apparatus of claim 9, including a pair of guide rollers positioned on opposite sides of said cylinder drum and substantially diametrically opposite each other, one of said guide rollers driving said continuous belt conveyor.

11. The apparatus of claim 10, wherein said housing sidewalls have brackets supporting said dosing means, said dosing means including a drive motor and a shaft having a helical screw conveyor, said shaft projecting through one of said sidewalls and including adjustment means.

12. The apparatus of claim 11, including a drive motor for the continuous jointed belt conveyor mounted on the side of the housing on which said dosing means drive motor is positioned.

13. The apparatus of claim 9, including a trough for collecting filtrate from said cylinder drum and filter belt for discharging the filtrate from the apparatus, said trough being attached between said housing sidewalls.

14. The apparatus of claim 13, wherein said housing sidewalls have brackets supporting said dosing means, said dosing means including a drive motor and a shaft having a helical screw conveyor, said shaft projecting through one of said sidewalls and including adjustment means.

15. The apparatus of claim 14, including a drive motor for the continuous jointed belt conveyor mounted on the side of the housing on which said dosing means drive motor is positioned.

16. The apparatus of claim 9, wherein said housing sidewalls have brackets supporting said dosing means, said dosing means including a drive motor and a shaft having a helical screw conveyor, said shaft projecting through one of said sidewalls and including adjustment means.

17. The apparatus of claim 16, including a drive motor for the continuous jointed belt conveyor mounted on the side of the housing on which said dosing means drive motor is positioned.

18. The apparatus of claim 9, wherein said filter belt is discharged from between said drum and said conveyor belt, a pair of spaced guide rollers adjacent the filter belt discharge and supporting said filter belt in an inclined plane, and a pressing roller positioned relative to said pair of spaced guide rollers to exert its weight on the portion of the filter belt which is positioned between the guide rollers.

19. The apparatus of claim 9, including wedge-shaped pockets positioned on the outer surface of at least a portion of said cylinder drum.

20. The apparatus of claim 9, wherein said reaction chamber is in said cylinder drum.

21. The apparatus of claim 1, including a pair of guide rollers positioned on opposite sides of said cylinder drum and substantially diametrically opposite each other, one of said guide rollers driving said continuous belt conveyor.

22. The apparatus of claim 21, wherein said filter belt is discharged from between said drum and said conveyor belt, a pair of spaced guide rollers adjacent the filter belt discharge and supporting said filter belt in an inclined plane, and a pressing roller positioned relative to said pair of spaced guide rollers to exert its weight on the portion of the filter belt which is positioned between the guide rollers.

23. The apparatus of claim 21, including wedge-shaped pockets positioned on the outer surface of at least a portion of said cylinder drum.

24. The apparatus of claim 21, wherein said reaction chamber is in said cylinder drum.

25. The apparatus of claim 1, wherein said filter belt is discharged from between said drum and said conveyor belt, a pair of spaced guide rollers adjacent the filter belt discharge and supporting said filter belt in an inclined plane, and a pressing roller positioned relative to said pair of spaced guide rollers to exert its weight on the portion of the filter belt which is positioned between the guide rollers.

26. The apparatus of claim 25, wherein said pressing roller is supported between two lever arms, and swivelling support means supporting said lever arms.

27. The apparatus of claim 25, including wedge-shaped pockets positioned on the outer surface of at least a portion of said cylinder drum.

28. The apparatus of claim 25, wherein said reaction chamber is in said cylinder drum.

29. The apparatus of claim 1, including wedge-shaped pockets positioned on the outer surface of at least a portion of said cylinder drum.

30. The apparatus of claim 29, wherein said reaction chamber is in said cylinder drum.

31. The apparatus of claim 1, wherein said reaction chamber is in said cylinder drum.

* * * * *